March 2, 1971  J. AUDET  3,566,722
TOOL HOLDING APPARATUS USED ON LATHES
FOR CUTTING VARIOUS CURVED SHAPES
Filed Dec. 3, 1968  6 Sheets-Sheet 1
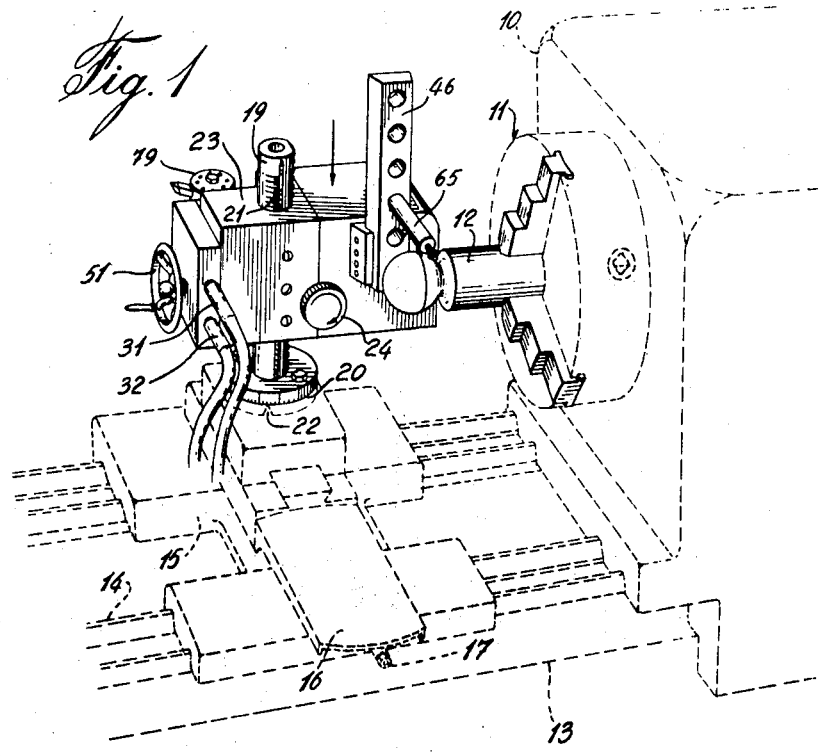
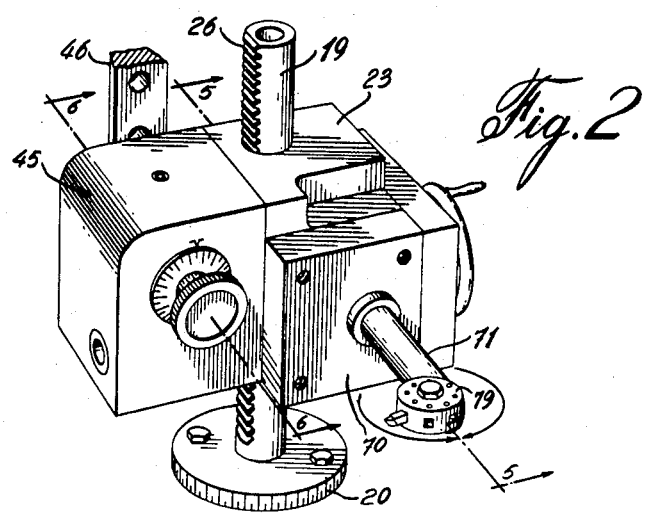
INVENTOR
Jean AUDET
ATTORNEY

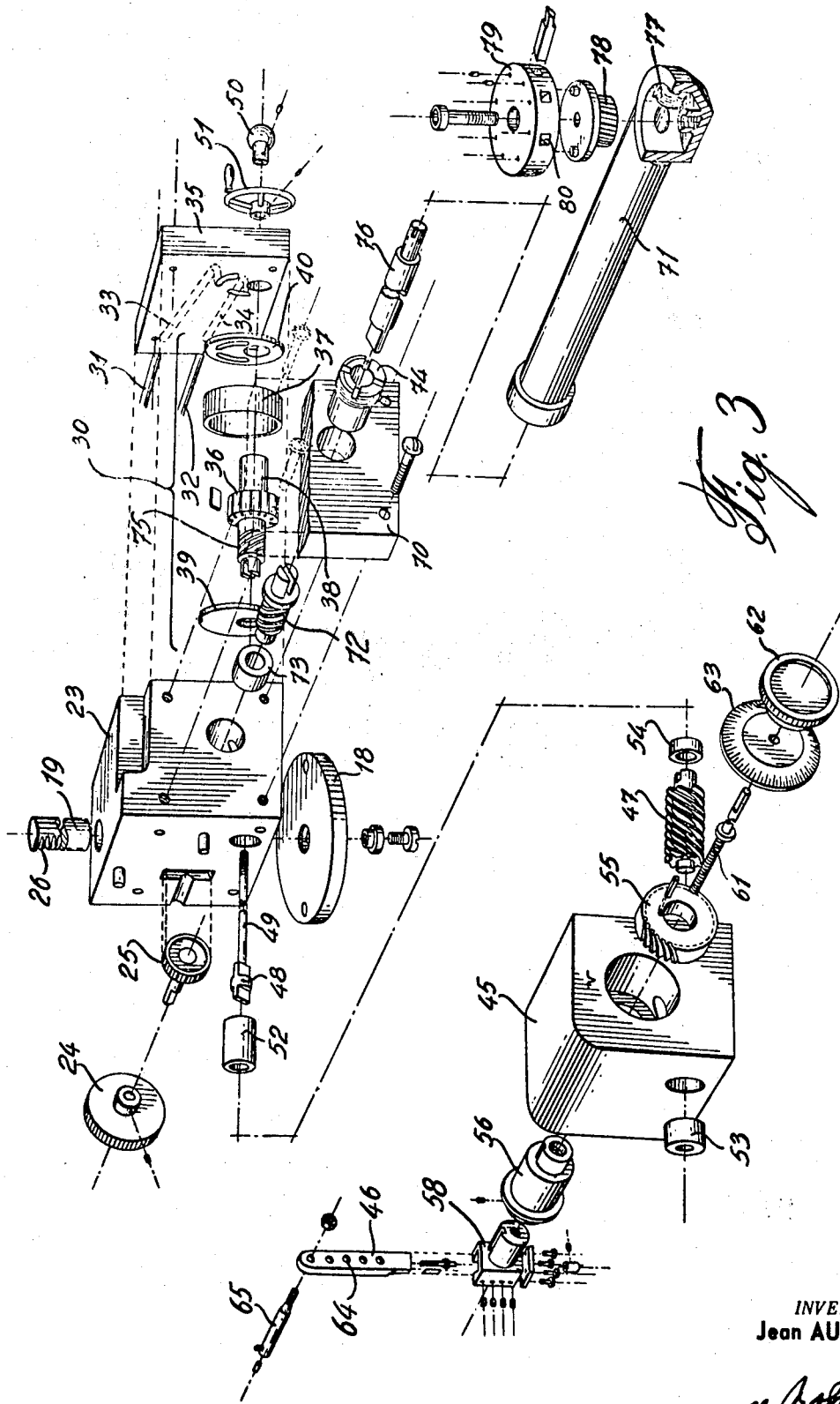

March 2, 1971  J. AUDET  3,566,722
TOOL HOLDING APPARATUS USED ON LATHES
FOR CUTTING VARIOUS CURVED SHAPES
Filed Dec. 3, 1968  6 Sheets-Sheet 3
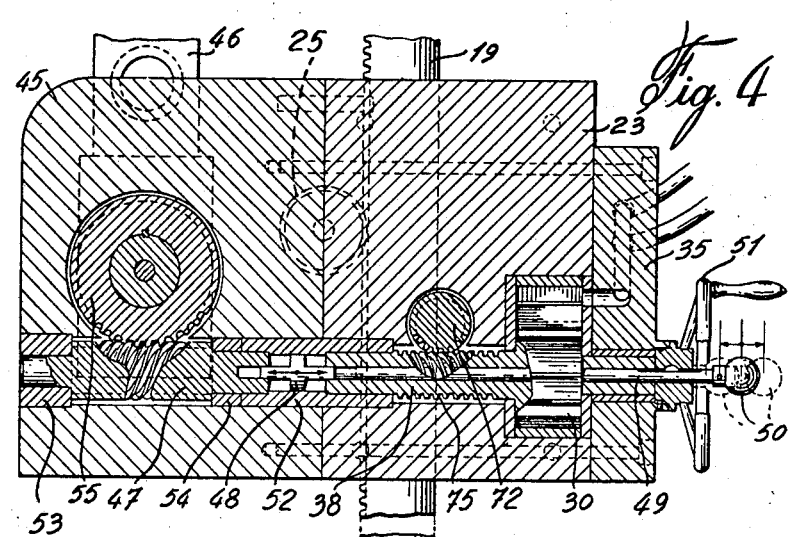
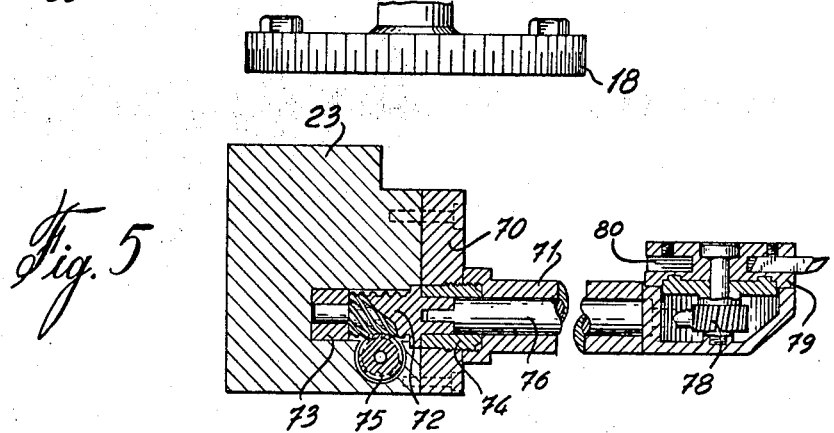
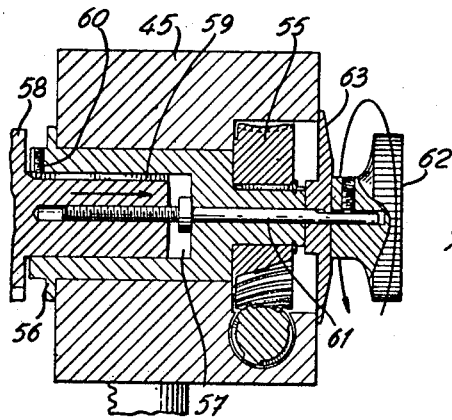
INVENTOR
Jean AUDET
ATTORNEY

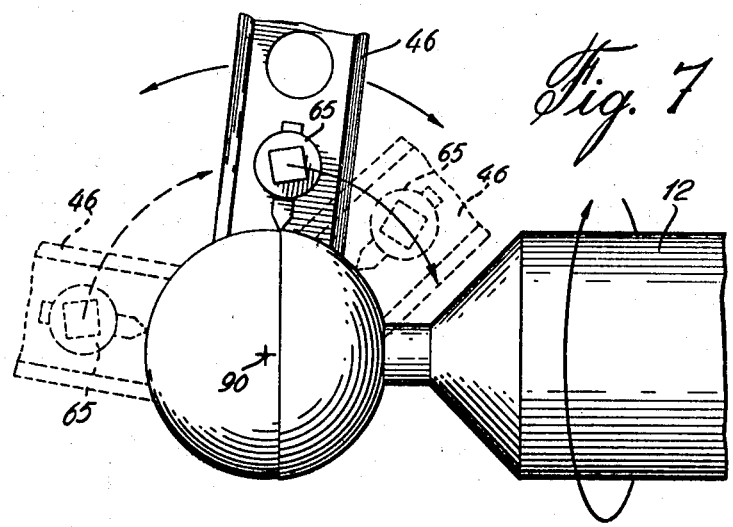
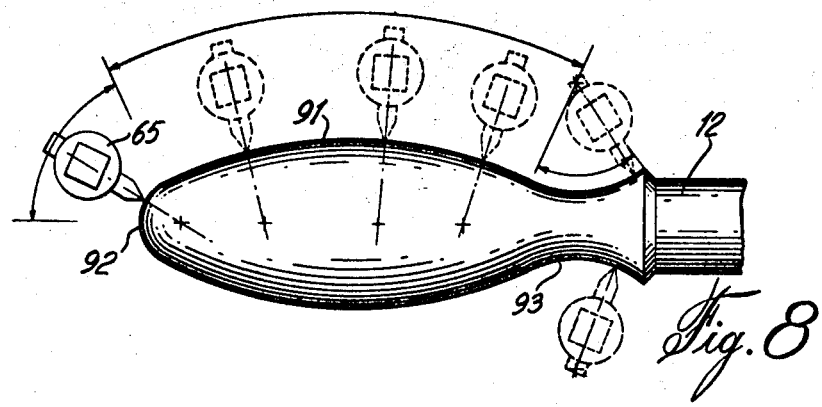
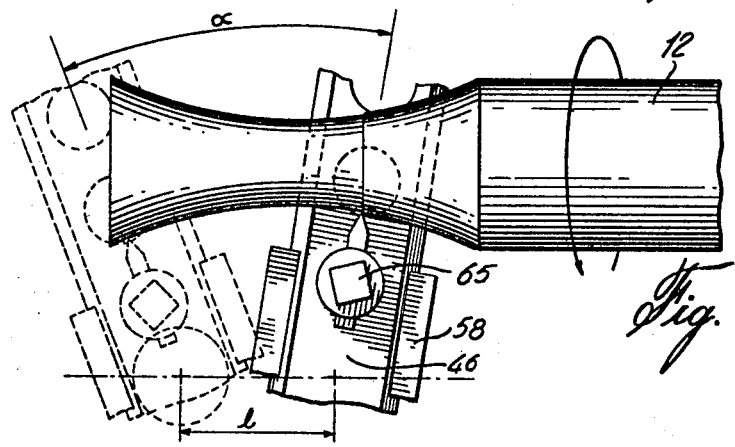
INVENTOR
Jean AUDET
ATTORNEY

INVENTOR
Jean AUDET

ATTORNEY

United States Patent Office 3,566,722
Patented Mar. 2, 1971

3,566,722
TOOL HOLDING APPARATUS USED ON LATHES FOR CUTTING VARIOUS CURVED SHAPES
Jean Audet, 1555 Desnoyers St.,
Sherbrooke, Quebec, Canada
Filed Dec. 3, 1968, Ser. No. 780,822
Int. Cl. B23b 5/40
U.S. Cl. 82—12           11 Claims

ABSTRACT OF THE DISCLOSURE

This invention relates to a tool holding apparatus used on lathes for cutting various curved shapes. The tool holding apparatus includes a casing mounted on the carriage of a lathe and enclosing a hydraulic motor coupled to a shaft. The shaft of the motor is coupled to an adjustable radius bar which is located outside the casing and adapted to oscillate a predetermined number of degrees depending on the amount of rotation of the motor in both directions. The shaft of the motor is also coupled to a swivel member located outside the casing and used to execute various curved shapes in the interior of a workpiece.

---

This invention relates to a tool holding apparatus used on lathes for cutting various curved shapes.

Various holding apparatus have been proposed in the prior art for cutting spherical, concave and convex shapes. They vary from simple manual attachment devices to complex arrangements which are costly and furthermore do not permit to cut a large selection of curved shapes.

It is the main feature of the invention to provide a tool holding apparatus adapted for use on lathes which is capable of executing various concave and convex curved shapes on the outside as well as on the inside of a workpiece.

It is also a feature of the invention to provide a tool holding apparatus which is hydraulically operated in a simple and reliable manner.

The tool holding apparatus, in accordance with the invention, includes a casing mounted on the carriage of a lathe and enclosing a hydraulic motor coupled to a shaft. The shaft of the motor is coupled to an adjustable radius bar which is located outside the casing and adapted to oscillate a predetermined number of degrees for cutting various concave and convex curved shapes. The shaft of the motor is also coupled to a swivel member located outside the casing and which may be used to machine various curved shapes inside a workpiece.

The casing of the tool holding apparatus is mounted on a base member rotatably mounted on the conventional cross-slide of the lathe, and is movable on a post extending vertically from the base. A rotatable handle threadably coupled to the post permits vertical movement of the casing with respect to the lathe. The base member and the post include graduated dials for indicating the position of the tool holding apparatus with respect to a reference position.

The shaft of the motor is coupled to a worm which in turn is coupled to a worm-gear secured to a hollow shaft. The adjustable radius bar is secured to a support member having a cylindrical portion which is keyed inside the hollow shaft for transmitting the rotational movement of the hollow shaft to the adjustable radius bar. The cylindrical portion of the support member is however movable axially for permitting a predetermined transverse movement of the adjustable radius bar with respect to the lathe. The adjustable radius bar has a number of holes spaced a predetermined distance apart for carrying a tool holder. In addition, a graduated dial is secured to the hollow shaft for indicating the angular position of the hollow shaft with respect to a reference position.

The shaft of the motor is coupled to the swivel member through a gear arrangement which permits the swivel member to rotate and execute various curved shapes inside a workpiece.

Finally, the holding apparatus is operated by means of a hydraulic control system which insures a gradual and accurate displacement of the cutting tools a predetermined number of degrees on a fixed radius.

The invention will now be disclosed with reference to the accompanying drawings which are for illustration purposes and not to be taken in a limiting way. In the drawings:

FIG. 1 illustrates a perspective view of the tool holding apparatus in accordance with the invention secured to a conventional lathe;

FIG. 2 illustrates a rear view of the tool holding apparatus of FIG. 1;

FIG. 3 illustrates an exploded view of the tool holding apparatus in accordance with the invention;

FIG. 4 illustrates a section view of the holding apparatus taken along the shaft of the motor;

FIG. 5 illustrates a section view of the holding apparatus taken along lines 5—5 of FIG. 2;

FIG. 6 illustrates a section view of the holding apparatus taken along lines 6—6 of FIG. 2;

FIGS. 7 to 9 illustrate various geometric curved shapes executed with the adjustable radius bar in accordance with the invention;

Figure 10:
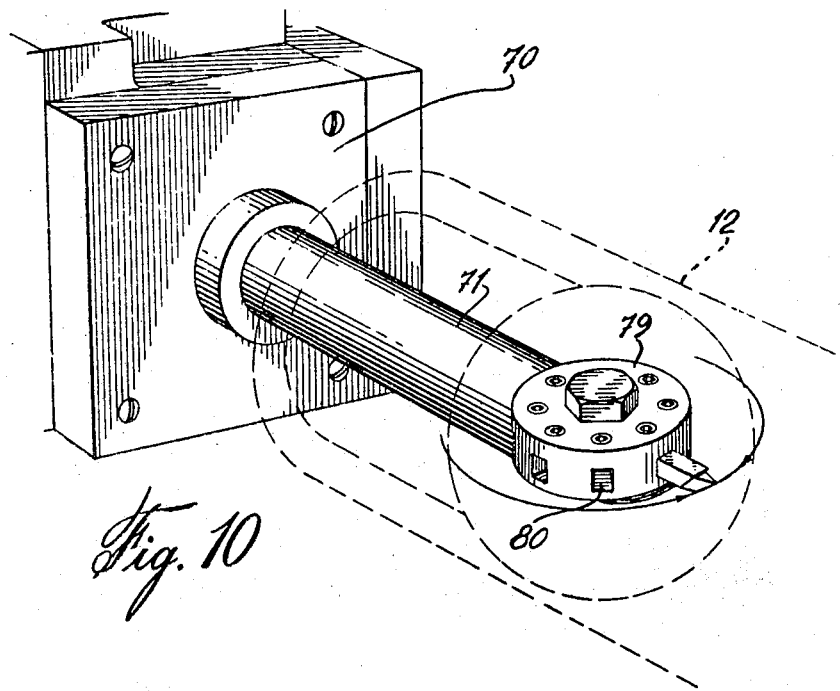
FIG. 10 is a perspective view of the swivel member used for cutting a hole inside a workpiece.

Referring to the drawings, FIG. 1 illustrates in dashed lines the headstock 10 of a conventional lathe for rotatably supporting a chuck 11 within which may be centered a workpiece 12. The lathe also includes a conventional bed 13 including slides 14 on which is slidably supported a carriage 15 supporting a cross slide 16. Cross slide 16 is movable laterally in a conventional manner by means of screw 17. A base member 18 including an upwardly extending post 19 is pivotally mounted on cross slide 16. Base member 18 and post 19 carry graduated dials 20 and 21 respectively for indicating the position of the holding apparatus with respect to a reference position indicated for example by pointer 22 on cross slide 16.

A casing 23 is mounted on post 19 and is vertically movable thereon by means of a rotatable handle 24 fastened to a gear 25 engaging cogs 26 on one side of post 19, as more clearly shown in the exploded view of FIG. 3.

As illustrated in FIGS. 3 and 4, casing 23 includes a conventional hydraulic motor 30 which is supplied with liquid through inlet and outlet tubes 31 and 32 communicating with channels 33 and 34 respectively in a plate 35 secured to casing 23. Motor 30 includes a rotor 36 surrounded by a sleeve 37 and secured to a shaft 38 which is journalled in discs 39 and 40 and plate 35.

Casing 23 has an extension 45 secured thereto and includes the mechanism for the operation of an adjustable radius bar 46 as illustrated more clearly in FIGS. 3 and 4. A worm 47 is coupled to shaft 38 by means of a coupling member 48 secured to a rod 49 which is coaxial with shaft 38 and movable axially therein by means of a knob 50. A hand wheel 51 is further coupled to rod 49. When knob 50 is in the position illustrated in FIG. 4, coupling member 48 couples form 47 with shaft 38. When knob 50 is pushed all the way in, moving coupling member 48 towards the left in a sleeve 52, worm 47 is coupled to hand wheel 51 for manual operation of the adjustable radius valve 46. When knob 50 is pulled out, worm 47 is disengaged by the shaft 38 and by the hand wheel 51.

Worm 47 is journalled in sleeves 53 and 54 and coupled to worm-gear 55. As illustrated in FIG. 3 and perhaps more clearly in FIG. 6, worm-gear 55 is fixed to a rotatable shaft 56 having a hollow portion 57 within which protrudes the cylindrical portion of a support member 58 for holding the adjustable radius bar 46. The cylindrical portion of support member 58 carries a slot 59 in which a key 60 is positioned for preventing the rotation of support member 58 with respect to hollow shaft 56 while permitting axial movement of support member 58 within the hollow shaft 56. An adjustment screw 61 is threaded in the cylindrical portion of support member 58 and fastened to handle 62 for moving support member 58 transversely with respect to the casing extension 45. In addition, a graduated dial 63 is secured to shaft 56 for indicating the angular position of shaft 56 with respect to a reference position.

The adjustable radius bar 46 has a number of holes 64 spaced a predetermined distance apart from receiving a tool holder 65. The adjustable radius bar 46 is slidable in support member 58 and is fastened in its exact position by means of screws, for example, so as to obtain a predetermined radius of curvature when radius bar 46 is oscillated by the alternative movement of motor 30 as it will be explaned more clearly in the later part of the description.

Casing 23 includes a further extension 70 to which is threadably secured a tubular member 71 as illustrated in FIGS. 2 and 3 and perhaps more clearly in FIG. 5. A worm 72 journalled in sleeves 73 and 74 is coupled for rotation with a worm portion 75 of shaft 38. As illustrated to FIGS. 3 and 5, sleeve 74 is threaded on the outside to be screwed into casing extension 70 and a portion thereof extends outside of casing extension 70 for receiving the threaded end of tubular member 71. A shaft 76 which is coupled at one end to worm 72 and at the other end to a worm 77 drives a worm-gear 78 secured to swivel 79. Swivel member 79 has a number of holes 80 for receiving suitable tools.

The operation of the adjustable radius bar will now be disclosed with reference to the drawings in general and more particularly to FIGS. 7, 8 and 9. The rotation of motor 30 a predetermined number of turns in one direction and back in the other direction causes the adjustable radius bar, which is coupled to the shaft 38 by means of coupling member 48 and gears 47 and 55 to oscillate a predetermined number of degrees. The rotation of motor 30 in one direction and in the other is controlled by a conventional alternator which is positioned in a hydraulic control system disclosed in a later part of the description. The progressive movement of the tool for removing a continuous shaving on a workpiece is produced by the rotation of handle 24 illustrated in FIGS. 1 and 3. The back and forth movement of the adjustable radius bar 46 about a single pivot point 90 as illustrated in FIG. 7 will execute a sphere.

On the other hand, if the oscillation of the adjustable radius bar 46 is combined with the normal feed of the lathe, a curved shape such as represented by the central ellipsoidal portion 91 of the workpiece illustrated in FIG. 8 is produced. If the radius of the bar 46 is changed, the end 92 of the workpiece may be made. Finally, if the pivot point of the bar 46 is moved above the workpiece, or the tool holder 65 positioned below the workpiece, the end 93 of the workpiece in question may be made.

If the oscillation of the bar 46 whose tool holder is positioned below the workpiece is combined with the normal feed of the lathe, a curved shape as illustrated in FIG. 9 may be obtained. In such figure, $\alpha$ represents the number of degrees of the oscillation and $l$ the length of the feed of the lathe.

Figure 11:
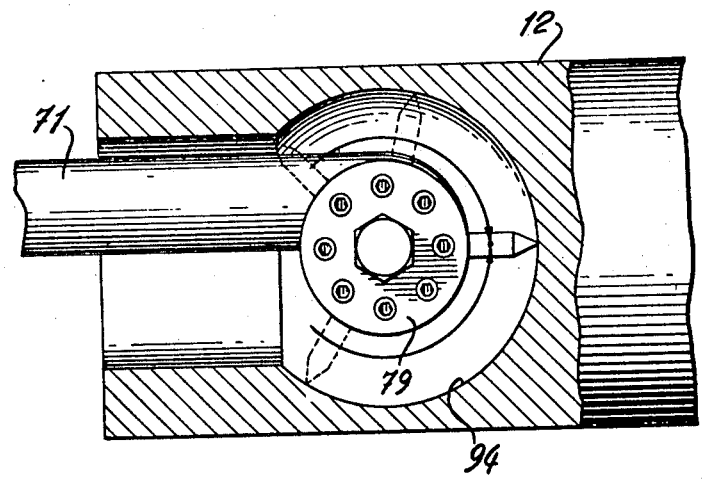
FIG. 11 illustrates the swivel member at work inside a workpiece.

The swivel member 79 is also adapted to oscillate in response to the back and forth rotation of motor 30 as illustrated in FIG. 10. The progressive movement of the tool for removing a continuous shaving inside the workpiece may be produced by the normal feed of the lathe and/or the lateral movement of cross-slide 16. The back and forth oscillation of swivel member 79 may be used for example to make a hole in a workpiece 94 such as illustrated in FIG. 11. It is to be understood however that other curved shapes may also be executed inside workpiece 94 with the swivel member 79.

Figure 12:
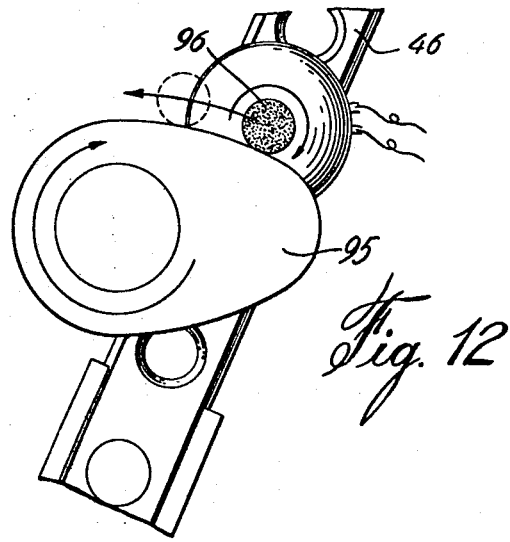
FIG. 12 illustrates the adjustable radius bar used for making cams.

As illustrated in FIG. 12, the adjustable radius bar 46 may also be used to polish a cam 95 located in the chuck 12 of the lathe provided however that the rotation of the lathe is rendered intermittent. For polishing the cam, a small electrically driven grinder 96 is secured to bar 46.

Figure 13:
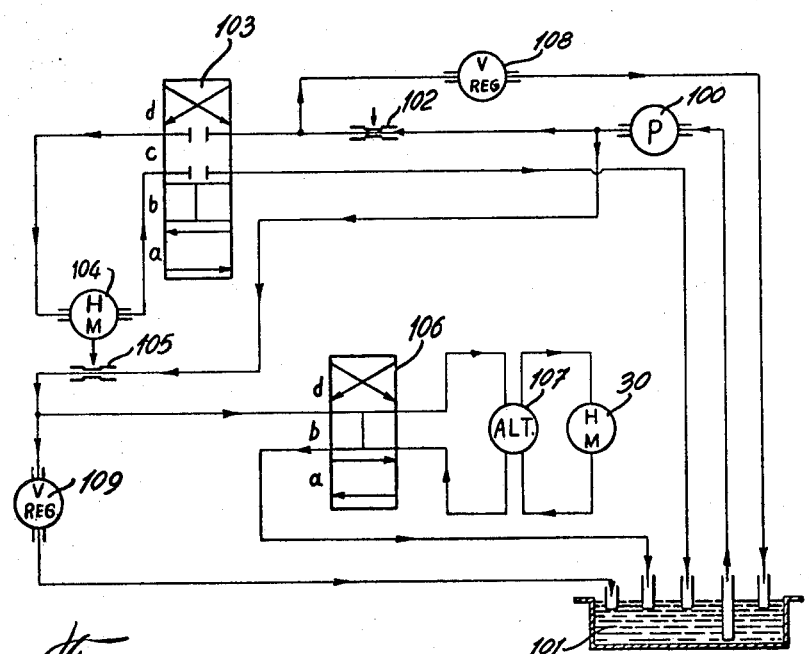
FIG. 13 illustrates a hydraulic control system for operating the holding apparatus.

FIG. 13 illustrates a diagram of a hydraulic control system which may be used for operating the lathe. There is shown a pump 100 for circulating a liquid, such as oil, contained in a tank 101 through a manual valve 102 and a control valve 103 to a hydraulic motor 104. Control valve 103 controls the movement of the liquid in motor 104 and has a position $a$ to permit rotation of the motor 104 in one direction, a position $b$ to permit the motor to rotate freely in its own liquid, a position $c$ to stop the motor and a position $d$ to permit the motor to rotate in the opposite direction. Hydraulic motor 104 controls an automatic valve 105 which controls the flow of liquid from pump 100 through control valve 106 and alternator 107 to hydraulic motor 30. Hydraulic motor 30 is of course the motor illustrated in FIGS. 3 and 4 of the drawings and located in casing 23. Control valve 106 is similar to control valve 103 except that it does not have position $c$. Alternator 107 changes the direction of rotation of motor 30 and consequently controls the amplitude of oscillation of bar 46 and swivel member 79.

Alternator 107 is a conventional device similar to control valve 103 except that it has two positions $a$ and $d$ only which are hydraulically operated. The variation of the direction of flow of the fluid (the alternation) may be varied rapidly or slowly and it may also stay in one direction as in the other. The speed of the alternation is usually controlled by a control valve.

Regulating valves 108 and 109 control the liquid pressure and permit the return of the liquid to the tank 101 when control valve 103 is closed and when the pressure in the hydraulic system is too high.

I claim:

1. A tool holding apparatus for a lathe having a movable carriage comprising:
   (a) a casing mounted on said carriage;
   (b) a hydraulic motor located in said casing;
   (c) a shaft coupled to said motor and adapted to be driven by said motor;
   (d) an adjustable radius bar coupled to said shaft through an arrangement including a worm coupled to said shaft, a worm-gear coupled to said worm, a hollow shaft secured to said worm-gear, a support member for supporting said adjustable radius bar and having a cylindrical portion protruding in said hollow shaft, and means for slidably moving the cylindrical portion of said support member in said hollow shaft;
   (e) said adjustable radius bar being adapted to oscillate a predetermined number of degrees in response to the rotation of said motor in both directions for cutting various curved shapes.

2. A tool holding apparatus as defined in claim 1, further comprising a laterally slidable cross slide mounted on said carriage; a base member mounted on said cross slide; a post extending upwardly from said base member for mounting said casing; and means for vertically moving said casing on said post.

3. A tool holding apparatus as defined in claim 2, further including graduated dials located on the base member and on the post for indicating the position of the holding apparatus with respect to a reference position.

4. A tool holding apparatus as defined in claim 1, wherein said bar has a number of holes spaced a predetermined distance apart and further including a tool holder positioned in one of said holes.

5. A tool holding apparatus as defined in claim 1, wherein said last-mentioned means include a screw threadably mounted in the cylindrical portion of said support member and a handle secured to said screw for rotating said screw.

6. A tool holding apparatus as defined in claim 1, further including a graduated dial secured to said hollow shaft for indicating the angular position of said hollow shaft with respect to a reference position.

7. A tool holding apparatus as defined in claim 1, further including a coupling member, a rod coaxial with said shaft secured to said coupling member and a hand wheel secured to said rod wherein, in a first position of said coupling member, said worm is engaged by said rod, in a second position of said coupling member, said worm is engaged by said shaft, and, in a third position of said coupling member, said rod is uncoupled from said worm.

8. A tool holding apparatus as defined in claim 1, further comprising a swivel member coupled to said shaft through an arrangement including a tubular member secured to said casing; a shaft mounted for rotation within said tubular member; and gear means secured to the end of the last mentioned shaft for coupling the first mentioned shaft to the swivel member; said swivel member being adapted to oscillate a predetermined number of degrees in response to the rotation of said motor in both directions for cutting various curved shapes.

9. A tool holding apparatus as defined in claim 8, wherein said gear means include a first worm secured to one end of the last mentioned shaft for coupling the last mentioned shaft to a corresponding worm portion on the first mentioned shaft; a second worm secured to the other end of the last mentioned shaft; and a worm-gear secured to the swivel member and coupled to the second worm.

10. A tool holding apparatus as defined in claim 1, further comprising a hydraulic control system for operating said hydraulic motor, said control system comprising:
    an additional hydraulic motor;
    a tank containing a liquid;
    a pump for circulating said liquid from said tank into both said hydraulic motors;
    a manual valve for controlling the flow of liquid from said tank to said additional motor;
    a first control valve for controlling the movement of said liquid into said additional hydraulic motor;
    an automatic control valve operated by said additional hydraulic motor for controlling the flow of liquid to the first mentioned hydraulic motor;
    an alternator connected to the first mentioned hydraulic motor for controlling the angle of oscillation of said adjustable radius bar and said swivel member; and
    a second control valve for controlling the movement of said liquid into the first hydraulic motor.

11. A tool holding apparatus as defined in claim 10, further comprising regulator valves for returning said fluid to said tank when the first valve is closed and when the pressure in the hydraulic control system is too high.

References Cited
UNITED STATES PATENTS

| | | | |
|---|---|---|---|
| 494,737 | 4/1893 | Dost | 82—12 |
| 2,867,145 | 1/1959 | Markstrum | 82—12 |
| 2,933,965 | 4/1960 | Murphy | 82—12 |
| 3,118,215 | 1/1964 | Smith | 82—12X |

FOREIGN PATENTS

| | | | |
|---|---|---|---|
| 995,353 | 8/1951 | France | 82—12 |

LEONIDAS VLACHOS, Primary Examiner